(12) United States Patent
Stevenson

(10) Patent No.: US 6,698,279 B1
(45) Date of Patent: Mar. 2, 2004

(54) METHOD AND APPARATUS FOR TESTING THE INTEGRITY OF RAILROAD LOCOMOTIVE WHEELS AND RAILROAD CAR WHEELS

(75) Inventor: Michael Stevenson, Slidell, LA (US)

(73) Assignee: Ultrasonics and Magnetics Corporation, Harvey, LA (US)

( * ) Notice: Subject to any disclaimer, the term of this patent is extended or adjusted under 35 U.S.C. 154(b) by 0 days.

(21) Appl. No.: 08/824,211

(22) Filed: Mar. 25, 1997

Related U.S. Application Data
(60) Provisional application No. 60/029,731, filed on Oct. 23, 1996.

(51) Int. Cl.⁷ .................................................. G01M 19/00
(52) U.S. Cl. ....................................................... 73/118.1
(58) Field of Search ............................... 73/118.1, 632, 73/633, 636

(56) References Cited

U.S. PATENT DOCUMENTS

| | | | |
|---|---|---|---|
| 4,130,021 A | 12/1978 | Mueller et al. | 73/633 |
| 4,130,022 A | 12/1978 | Goodrich et al. | 73/633 |
| 4,204,434 A * | 5/1980 | Whitsel | 73/622 |
| 4,296,753 A | 10/1981 | Goudin | 73/633 |
| 4,368,642 A | 1/1983 | Carodisky | 73/633 |
| 4,399,822 A | 8/1983 | Theumer | 73/633 |
| 4,418,698 A | 12/1983 | Dory | 73/633 |
| 4,530,362 A | 7/1985 | Hetz | 73/633 |
| 4,622,517 A | 11/1986 | Arnaud et al. | |
| 5,392,652 A * | 2/1995 | Levesque et al. | 73/632 |
| 5,654,510 A * | 8/1997 | Schneider | 73/622 |
| 5,864,065 A * | 1/1999 | Prorok et al. | 73/622 |

* cited by examiner

*Primary Examiner*—Max Noori
(74) *Attorney, Agent, or Firm*—Garvey, Smith, Nehrbass & Doody, L.L.C.; Seth M. Nehrbass; Charles C. Garvey, Jr.

(57) ABSTRACT

The present invention provides a method and apparatus for the testing of railroad locomotive wheels and railroad car wheels using an ultrasonic probe and a probe holder that pivotally connects to the probe at a specially shaped yoke member. The probe has a pair of extension arms available in different lengths, such as four inches, seven inches, and fourteen inches long. These various handles in kit form enable a user to apply very even pressure to every portion of the inside and outside surfaces of the periphery of the wheel in the thickened peripheral portion of the wheel that is typically tested for defects. With the present invention, the user can pivotally position the handle or extension arm relative to the wear surface of the transducer notwithstanding the fact that the transducer must be positioned 360 degrees about the wheel and on both the inside and outside surfaces of the wheel as part of the testing procedure.

6 Claims, 4 Drawing Sheets

METHOD AND APPARATUS FOR TESTING THE INTEGRITY OF RAILROAD LOCOMOTIVE WHEELS AND RAILROAD CAR WHEELS

CROSS-REFERENCE TO RELATED APPLICATIONS

Priority of U.S. Provisional Patent Application Serial No. 60/029,731, filed Oct. 23, 1996, is hereby claimed. This application is hereby incorporated by reference.

STATEMENT REGARDING FEDERALLY-SPONSORED RESEARCH OR DEVELOPMENT

Not applicable

REFERENCE TO A "MICROFICHE APPENDIX"

Not applicable

BACKGROUND OF THE INVENTION

1. Field the Invention

The present invention relates to the testing of railroad locomotive wheels and railroad car wheels for flaws such as cracks and the like. A hand held wand with a yoke end portion that carries a transducer pivotally attached to the yoke at its lower or distal end portion can be used to maintain a flat transducer wear surface selected in continuous face-to-face contact with the selected inside or outside surface of the wheel, even when the locomotive is attached to a string of other locomotives or cars so that movement of the locomotive wheels for testing purposes is difficult or at least very expensive.

2. General Background of the Invention

Locomotives are often connected together, one after the other in order to pull very heavy loads. These locomotives are very expensive pieces of equipment that are used on an almost continual basis in order to maximize the return to their owner. As with any mechanical vehicle, locomotives continuously wear and the locomotive wheels are no exception.

The wheels of locomotives are subjected to substantial wear because they bear directly against metal rails. After wear removes a certain amount of the wheel, the wheel must be replaced. In order to test these locomotive wheels on a regular basis for flaws and excess wear, ultrasonic testing has been employed. In the prior art, ultrasonic testing has typically used a round transducer that is hand held by a technician to position a wear surface against the surface of the railroad wheel to be tested. The transducer is moved continuously back and forth while the technician observes an oscilloscope to look for peaks of a graphical output that equates with a flaw or defect in the wheel.

One of the problems with this type of prior art ultrasonic testing of railroad locomotive wheels is that of lost time and extra expense because the locomotive must be moved. Typically, a locomotive will be tested by locating the locomotive above a work pit so that the technician can place the transducer against the desired surface of the wheel and move the transducer back and forth in a circuitous path until about one-half of the peripheral surface of the wheel has been tested. The technician typically uses chalk marks on the surface of the wheel to mark off an area that equates with about 180 degrees or one-half of the wheel. After one-half of the wheel is tested, the locomotive must then be moved so that the second half of the wheel is presented to the technician.

The unscheduled movement of a railroad locomotive can be a very expensive proposition. Often times, a locomotive is attached to a long string of other locomotives and/or railroad cars and cannot simply be rolled or moved without involving a number of personnel that must be paid, sometimes on an overtime basis. When a potential problem (e.g., excessive wear) is suspected, testing must be conducted immediately to avoid an accident, derailing, personal injury and possible fatalities.

Thus, there is a need for a method of testing railroad locomotive wheels wherein testing can be achieved without having to roll the locomotive.

Incorporated herein by reference is the "Association of American Railroads—Operations and Maintenance Department—Mechanical Division—Manual of Standards and Recommended Practices—Section G—Wheels and Axles—Issue of 1994" published by the Association of American Railroads, 50 F Street, N.W., Washington, D.C. 20001-1564.

BRIEF SUMMARY OF THE INVENTION

It is thus an object of the present invention to provide a simple, straightforward, yet workable solution to the problem of testing a railroad locomotive wheel without having to move the locomotive in order to present various portions of the wheel to the technician that is testing the wheel for defects.

The present invention solves these problems in a simple, straightforward, yet efficient manner by providing a probe apparatus and method of testing that includes an elongated handle having a lower or distal end portion that forms a pivotal connection with a transducer.

The transducer presents a flat wear surface that directly contacts the wheel during testing. One of the features of the present invention is that two handles are provided, a short handle for testing the outside of the wheel and a longer handle for testing the inside of the wheel. This enables the technician to apply very even pressure which is critical during testing of railroad wheels using an ultrasonic transducer.

The present invention thus provides an improved method of testing a metallic railroad wheel having a hub, web, wear surface, and a thickened peripheral portion with inner and outer surfaces.

The method of the present invention first defines inner and outer surfaces that are test surfaces on the respective inner and outer surfaces of the thickened peripheral portion of the wheel.

The user then places a transducer with a flat wear surface on the inner surface test area. A transducer is manipulated with an elongated handle having a gripping portion that can be gripped by a technician during use and a digital end portion that is pivotally connected to the transducer.

By varying the angle between the plane of the wear surface and the axis of the handle at the gripping surface, a very efficient testing pattern can be developed by the user and while simultaneously maintaining appropriate flat surface to surface contact between the wear surface of the transducer and the test surface in question.

An oscilloscope is used to display defects that may exist in the wheel at the inner surface test area.

The method of the present invention further comprises the step of applying a liquid to the transducer wear surface so that the liquid is continuously applied to the wheel during testing for acoustic coupling and for indicating the part of the wheel that has been tested already. A fluid source can be channeled to the transducer for continuously supplying fluid to the transducer so that as the user moves the transducer over the test surface area, the portion of the test surface area that has been tested is continuously wetted for clearly indicating to the user that portion of the wheels has already been tested.

The method of the present invention comprises varying the angle by pivoting the handle upon the transducer.

With the testing of the present invention, the further step is provided of using two handles of different lengths for testing the respective inside and outside surfaces of the wheel. This enables the user to access portions of the wheel that is typically inaccesible because of parts of the train chassis that extend downwardly toward the middle of the wheel.

The method of the present invention further comprises the step of attaching the probe to the handle with two spaced apart pivot pins.

The method of the present invention further comprises the step of placing the pivot pins about one hundred eighty degrees (180°) apart.

With the method of the present invention, the handle has a distal end portion with a slot surrounded by a wall portion and further comprises the steps of mounting the transducer within the slot and pivoting the transducer relative to the handle with pins that extend between the wall portion and the transducer.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
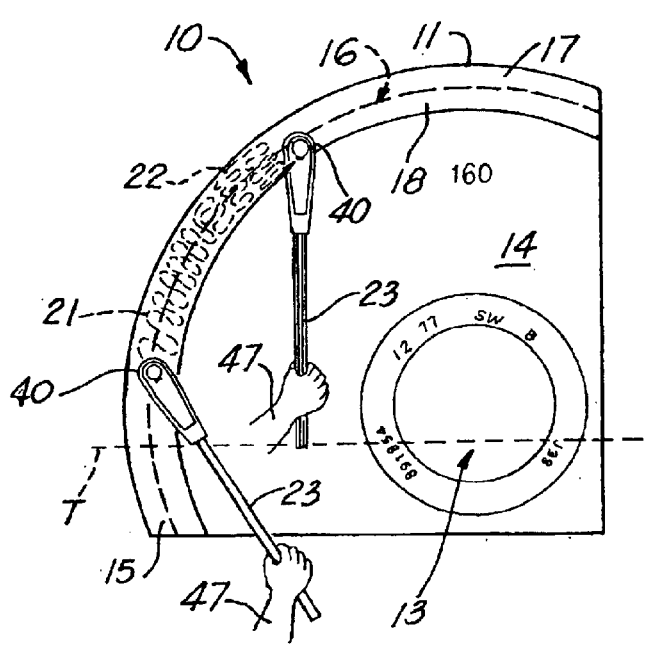
FIG. 1 is a schematic side view of the method of the present invention illustrating the testing of a railroad locomotive wheel using the apparatus of the present invention.
Figure 2:
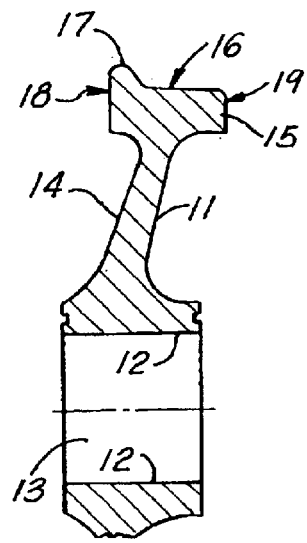
FIG. 2 is a partial sectional view of a typical railroad locomotive wheel showing hub, web, and rail engaging portions.
Figure 3:
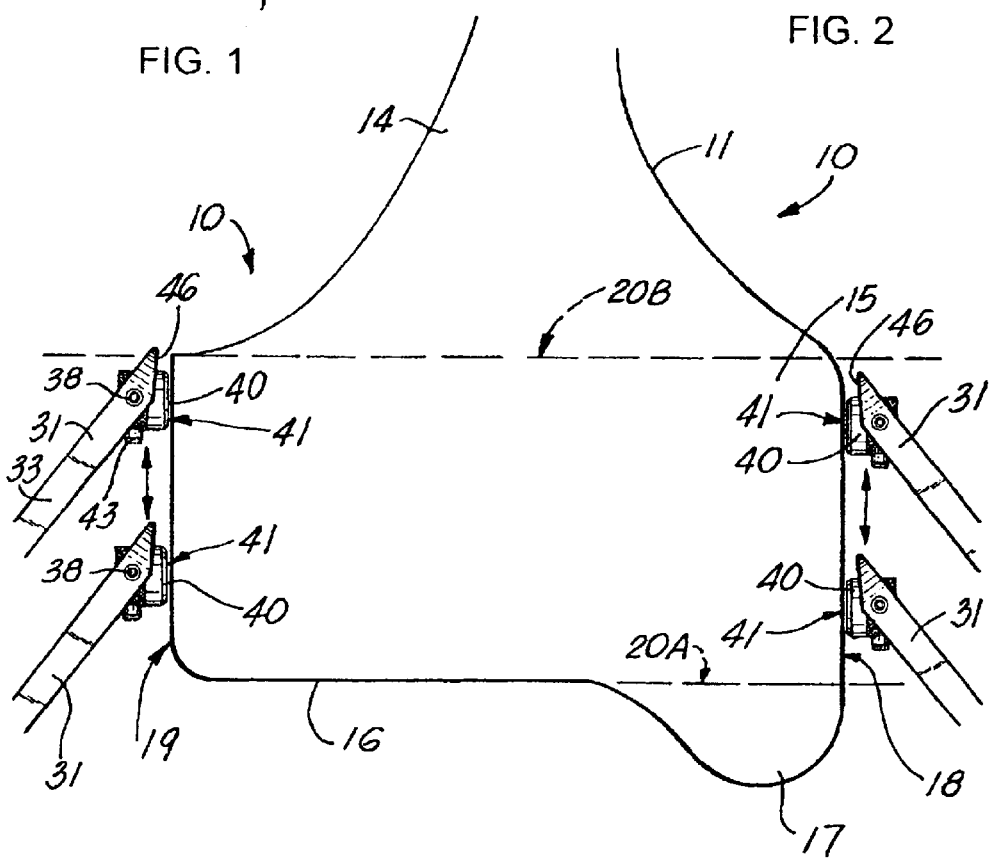
FIG. 3 is a perspective sectional view of a portion of a railroad locomotive wheel illustrating the method of the present invention.

FIGS. 1–3 show generally the method of the present invention and the apparatus of the present invention designated by number 10 in FIGS. 1, 3 and 8–9.

Railroad inspection probe apparatus 10 is used to examine railroad locomotive wheels 11 and related wheels such as the wheels of railroad cars. In FIGS. 1–3, railroad wheel 11 includes a hub 12 with an opening 13 through which an axle extends upon mounting of the railroad wheel 11 to the locomotive or railroad car. The chassis of the locomotive typically extends over the upper half of the wheel 11, denying access to the upper portion of the wheel 11. In FIG. 1, T indicates the train chassis. Extending from hub 12 is a web 14 portion that forms a connection with a peripheral thick portion 15. The peripheral thick portion 15 is that portion which engages the railroad tracks during use. Thus, the thick portion 15 provides a wear surface 16 and a flange 17 that fits the inside edge of the railroad track and prevents derailment. The thick peripheral portion 15 includes a flat inside surface 18 and a flat outside surface 19. Reference lines 20A and 20B in FIG. 3 are drawn to define the area between the thickest part of the wheel 11 at the peripheral portion 15, the part to be tested for cracks, defects and the like with the method and apparatus of the present invention.

Figure 8:
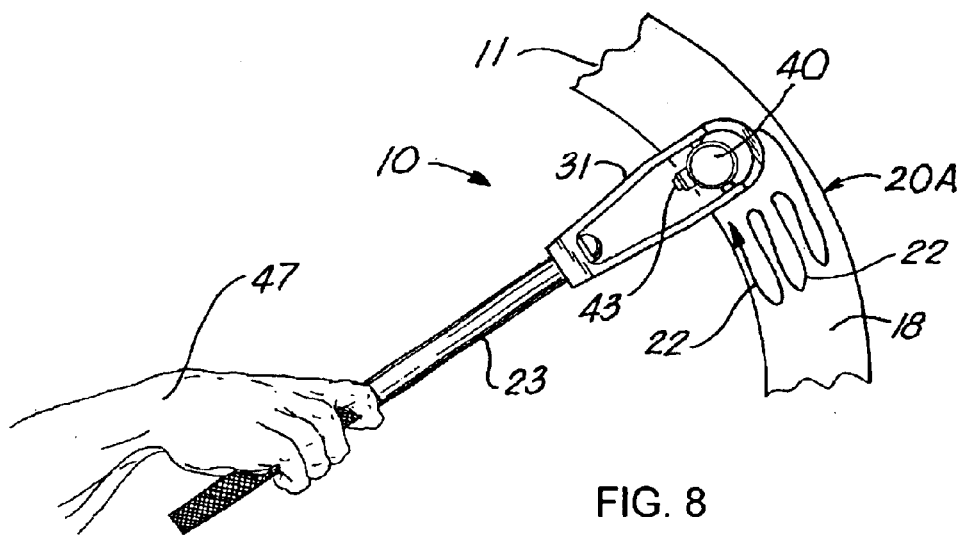
FIGS. 8 and 9 are perspective views illustrating the method of the present invention during the testing of a railroad locomotive wheel.
Figure 9:
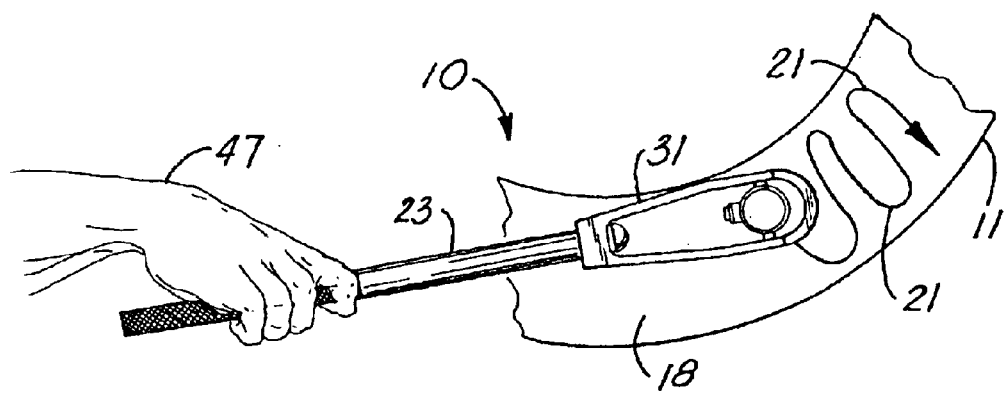

In FIGS. 1 and 8–9, the user moves a transducer 40 over a circuitous path 21. With the method of the present invention, the circuitous path 21 first travels back and forth in between the lines 20A and 20B along radial lines as shown in the drawings. The path 22 is an alternate path that is generally parallel to the reference lines 20A and 20B as shown in FIGS. 1 and 8.

With the method of the present invention, the wheel 11 is preferably checked by first traversing the entire inside or outside selected surface 18 or 19 with both a radial type travel path such as 21 and then with a travel path such as 22 wherein the user moves the wand and the transducer 40 back and forth as shown in FIG. 8.

By traversing the entire surface 18 and 19 using both of the types of travel paths 21 and 22 as shown in the drawings, the entire wheel is covered at least two times by the transducer 40. Further, water or another suitable acoustic couplant can be added to the transducer through a port (not shown) or by wetting the transducer 40 so that a path of water is deposited on the wheel 11 by the wear surface 41 of the transducer that is showing in fact the exact location that has already been traversed with the wear surface 41 of the transducer 40.

One of the problems with the prior art type method of testing a railroad wheel 11 with a transducer 40 having a wear surface 41 is that of reaching all portions of the wheel and without moving the locomotive or railroad car. With the present invention, two handles 23, 24 are provided including a longer handle 23 and a shorter handle 24 (see FIG. 4). This allows the user to apply very even pressure to all areas of the wheel, even those areas that are difficult to reach.

For areas of the wheel that are easy to reach, shorter handle 24 is preferable because the distance between the user's hand 47 and the transducer 40 is relatively short. However, for the upper portion of the wheel (especially on the inside surface 18), it is difficult to reach the surface to be tested and also apply even pressure. In such a case, the longer handle 23 is employed enabling the user to reach the highest arcuate surface 18 or 19 on the wheel and without moving the locomotive or railroad car during the process.

Figure 4:
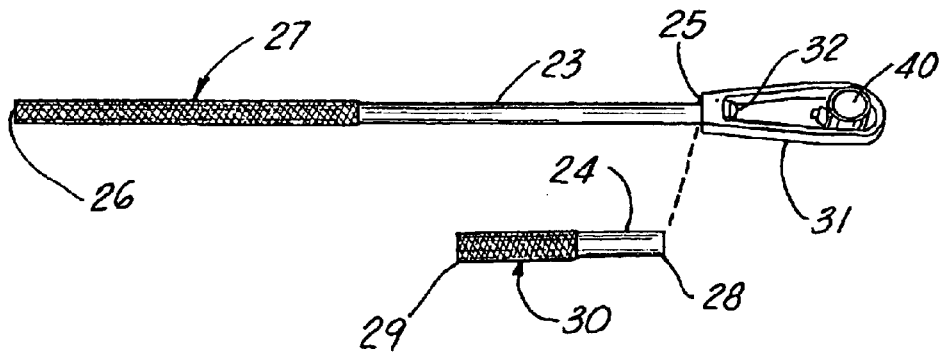
FIG. 4 is a top view of the preferred embodiment of the apparatus of the present invention.

In FIG. 4, handle 23 includes a lower or distal end 25 and a proximal upper end 26. The proximal upper end 26 includes a knurled gripping surface 27 that is typically gripped by the user's hand 47 as shown in FIGS. 1, 8 and 9. The short handle 24 has a lower or distal end 28, a proximal end 29, and a knurled gripping surface 30 adjacent the proximal end 29.

Figures 12, 13:
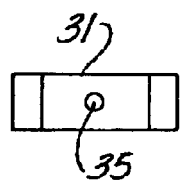
FIG. 12 is a side view of the probe holder.
FIG. 13 is a rear view of the probe holder.
Figure 14:
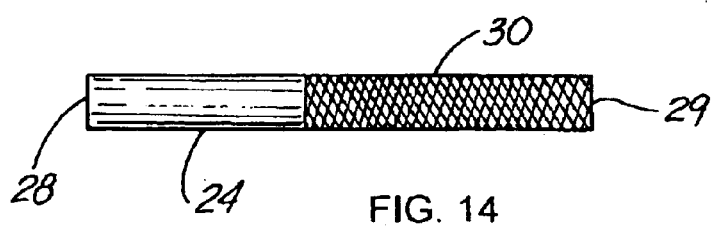
FIG. 14 is a fragmentary detailed view of the arm portion of the preferred embodiment of the apparatus of the present invention.

A yoke 31 is provided that is interchangeably connectable to either handle 23 or 24 using threaded fastener 32. Yoke 31 includes a continuous side wall 33 that surrounds an inner elongated slot or opening 34. Opening 35 (FIG. 13) in yoke 31 allows threaded fastener 32 to pass therethrough. Threaded fastener 32 provides external threads that engage correspondingly shaped internal threads of an internally threaded opening provided at the distal end 25 of handle 23. Similarly, the distal end 28 of handle 24 provides an internally threaded opening that engages threaded fastener 32.

Figure 5:
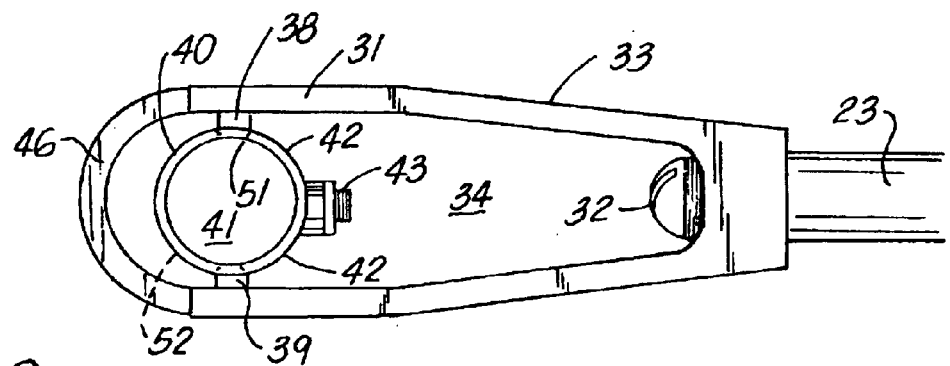
FIG. 5 is a fragmentary view of the preferred embodiment of the apparatus of the present invention illustrating the lower or distal end portion of the probe.
Figure 11:
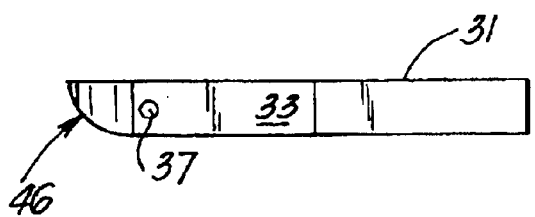
FIG. 11 is a fragmentary top view of the distal end portion of the probe holder.

A pair of openings 36, 37 extend through wall 33 (as shown in FIG. 11) of yoke 31. A pair of allen screws 38, 39 are mounted in openings 36, 37, respectively Each of the allen screws 38, 39 provides a conically shaped tip portion that fits a correspondingly shaped socket 51, 52 respectively (FIG. 5) on the peripheral side wall 42 of transducer 40. The conically shaped sockets 51, 52 and allen screws 38, 39 are spaced about one hundred eighty degrees apart as shown in FIG. 5.

Figure 10:
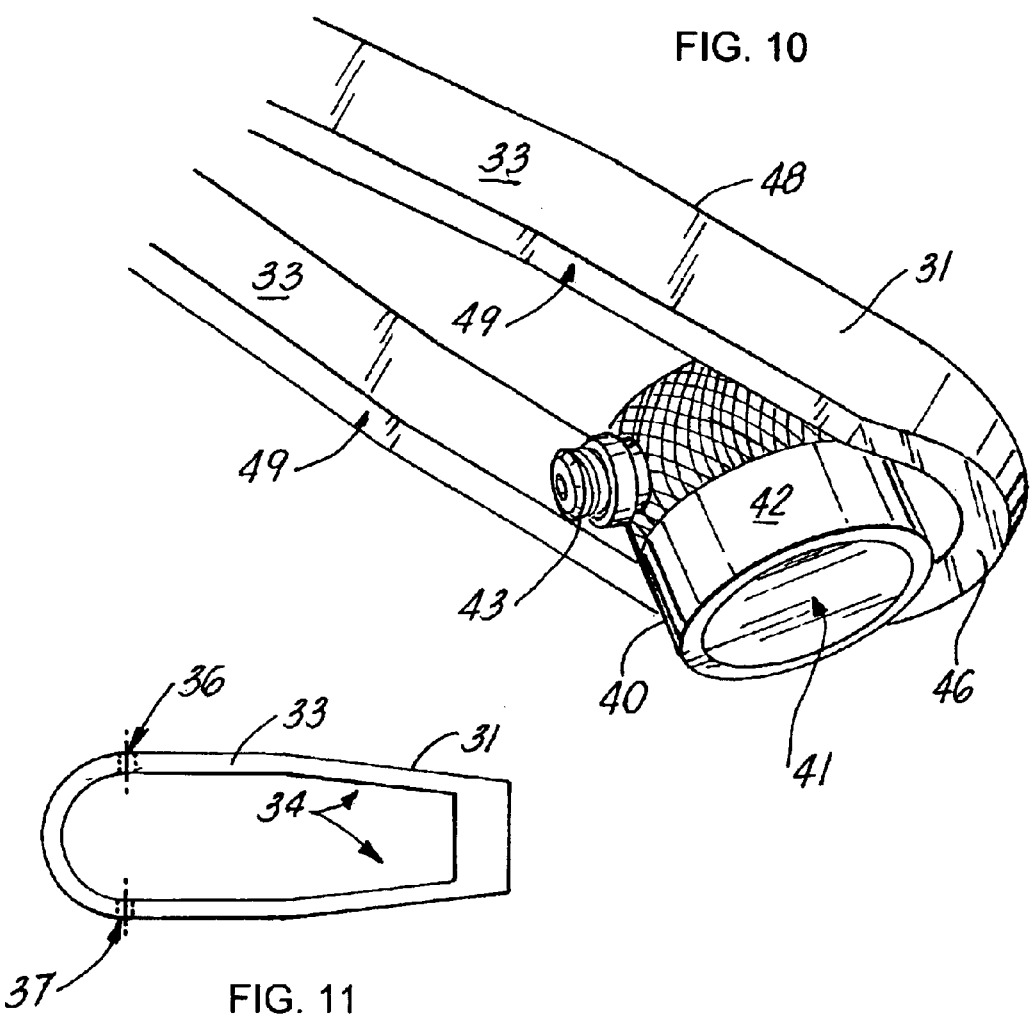
FIG. 10 is a perspective view of the preferred embodiment of the apparatus of the present invention.

FIG. 10 shows that transducer 40 has a flat wear surface 41 that engages either the surface 18 or the surface 19 of wheel 11.

Figure 6:
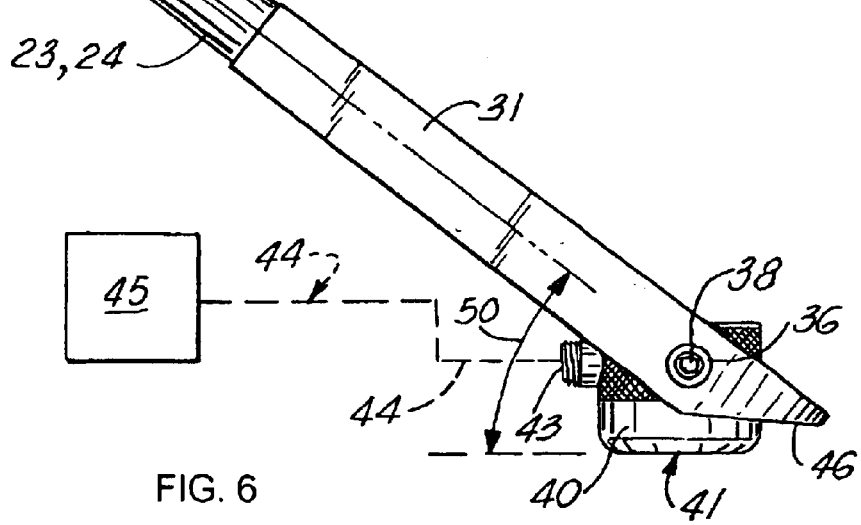
FIG. 6 is a fragmentary view of the lower or distal end portion of the probe of FIG. 4.
Figure 7:
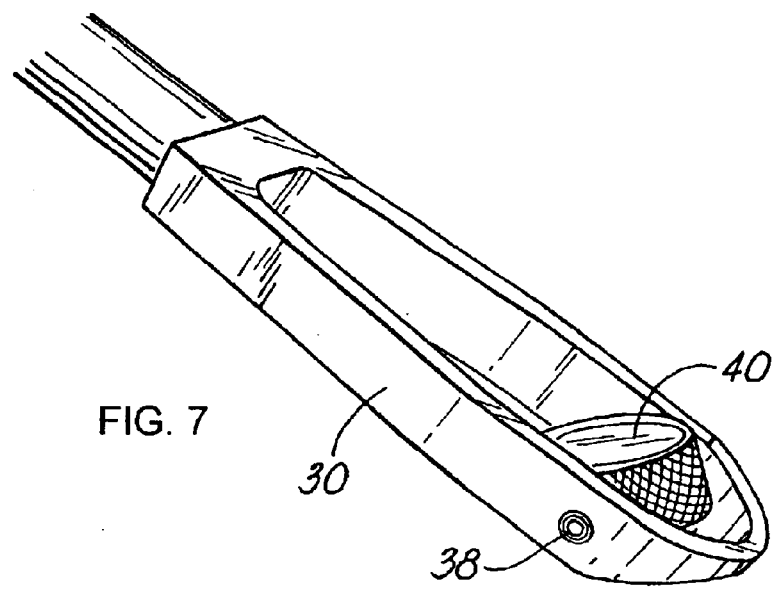
FIG. 7 is a partial perspective view of the preferred embodiment of the apparatus of the present invention.

Transducer 40 provides a threaded fitting 43 that enables a transducer cable 44 (FIG. 6) to be attached thereto during testing (a hose could also be attached to transducer 40 to allow acoustic coupling fluid to be easily supplied thereto). Instrument 45 can be, for example, a model USK-7D by Kraut Kramer that includes an oscilloscope screen for observing the test results, or a digital ultrasonic flaw detector model USD 10 "Krautkramer Branson" (with CRT screen). The yoke 31 includes an angled surface 46 that extends from lower surface 49 to upper surface 48. As shown in FIGS. 6 and 7, this angled surface 46 enables an angle of about forty-five degrees more or less to be formed in between the elongated linear handle 23 or 24 that is selected by a user and a surface to be tested which is defined by wear surface 41. In FIG. 6, that angle is indicated by the numeral 50.

The pivotal connection between yoke 31 and transducer 40 allows even pressure to be applied between wear surface 41 and the selected inside or outside 18, 19 surface of wheel periphery 15. Thus the present invention enables a single individual to completely test a railroad car wheel, including both its inside and outside surfaces and without having to move the railroad locomotive or railroad car.

Transducers that can be used with the present invention include 2.25 MHz 1" diameter round transducers, ½ inch diameter 5 MHz transducers, 7.5 MHz transducers, and 10 MHz transducers (the size refers to the wear surface of the transducer). Typical sound levels are on the order of 60–90 dB, for example.

The following is a list of suitable parts and materials for the various elements of the preferred embodiment of the present invention.

PARTS LIST

| Part Number | Description |
| --- | --- |
| 10 | railroad wheel inspection apparatus |
| 11 | railroad wheel |
| 12 | hub |
| 13 | opening |
| 14 | web |
| 15 | thick peripheral portion |
| 16 | wear surface |
| 17 | flange |
| 18 | inside surface |
| 19 | outside surface |
| 20A | reference line |
| 20B | reference line |
| 21 | travel path |
| 22 | travel path |
| 23 | handle |
| 24 | handle |
| 25 | lower distal end |
| 26 | proximal end |
| 27 | knurled gripping surface |
| 28 | distal end |
| 29 | proximal end |
| 30 | knurled gripping surface |
| 31 | yoke |
| 32 | threaded fastener |
| 33 | side wall |
| 34 | elongated opening |
| 35 | opening |
| 36 | opening |
| 37 | opening |
| 38 | allen screw |
| 39 | allen screw |
| 40 | transducer (preferably Texonics Model No. CF-0504-GP) |
| 41 | wear surface |
| 42 | peripheral side wall |
| 43 | threaded fitting |
| 44 | transducer cable |
| 45 | instrument |
| 46 | angled surface |
| 47 | user's hand |
| 48 | upper surface |
| 49 | lower surface |
| 50 | angle |
| 51 | conical socket |
| 52 | conical socket |
| T | train |

All measurements disclosed herein are at standard temperature and pressure, at sea level on Earth, unless indicated otherwise.

The foregoing embodiments are presented by way of example only; the scope of the present invention is to be limited only by the following claims.

What is claimed is:

1. A method of testing a metallic railroad wheel having a hub, web, wear surface and a thickened peripheral portion with inner and outer surfaces comprising the steps of:

a) defining inner surface and outer surface test areas on the respective inner and outer surfaces of the thickened peripheral portion of the wheel;

b) placing a transducer with a flat wear surface on the inner surface test area;

c) manipulating the transducer with an elongated handle having a gripping portion that can be gripped by a technician during use and a distal end portion that is pivotally connected to the transducer;

d) varying the angle between the plane of the wear surface and the axis of the handle at the gripping surface during testing; and e) using an oscilloscope to display defects that may exist in the wheel at the inner surface test area, wherein:

the handle in step "c" has a distal end portion with a slot surrounded by a wall portion and further comprising the steps of mounting the transducer within the slot and pivoting the transducer relative to the handle with pins that extend between the wall portion and the transducer.

2. The method of claim 1 further comprising the step of applying a liquid to the transducer wear surface so that a liquid is continuously applied to the wheel during testing for indicating the part of the wheel that has been tested.

3. The method of claim 1 wherein "d" comprises varying the angle by pivoting the handle upon the transducer.

4. The method of claim 1 further comprising the step of using two handles of different lengths for testing the respective inside and outside surfaces of the wheel.

5. The method of claim 1 further comprising the step of attaching the probe to the handle with two spaced apart pivot pins.

6. The method of claim 5 further comprising the step of placing the pivot pins about one hundred eighty degrees apart.

* * * * *